Aug. 7, 1951 H. E. F. C. LINGENBRINK 2,563,653

PHONOGRAPH TONE-ARM INDEXING MECHANISM

Filed Oct. 19, 1946 2 Sheets-Sheet 1

INVENTOR.
HERMANN E.F.C. LINGENBRINK
BY
Brown, Denk & Synnestvedt
AGENTS

PHONOGRAPH TONE-ARM INDEXING MECHANISM

Filed Oct. 19, 1946 2 Sheets-Sheet 2

INVENTOR.
HERMANN E.F.C. LINGENBRINK
BY
Brown, Denk & Synnestvedt
AGENTS

Patented Aug. 7, 1951 2,563,653

UNITED STATES PATENT OFFICE 2,563,653

PHONOGRAPH TONE-ARM INDEXING MECHANISM

Hermann E. F. C. Lingenbrink, Hilltown, Pa., assignor to Philco Corporation, Philadelphia, Pa., a corporation of Pennsylvania Application October 19, 1946, Serial No. 704,473

6 Claims. (Cl. 274—9)

The present invention relates to phonographs and, more particularly, to phonographs of the automatic record-changer type which are adapted to play a plurality of records consecutively. Specifically, the invention has to do with improvements in tone-arm indexing mechanism of the so-called "feeler" variety which operate, under control of the records to be played, to determine the position of the tone-arm when starting the playing of records of different sizes.

In certain types of automatic phonographs, especially in phonograph apparatus of the type shown and described in my copending application, Serial #668,195, filed May 8, 1946, the indexing mechanism includes means mounted for movement with the tone-arm and disposed for engagement with either one of a pair of mutually cooperative stop members, depending upon whether ten-inch or twelve-inch records are to be played. While the construction of the indexing mechanism disclosed in my copending application aforesaid adequately serves the purpose, I find that, in practice, the parts must be manufactured and assembled with care and precision, in order to insure proper operation under all possible conditions. For example, I find that the pickup stylus may fail to engage the starting groove of a record unless the forces, to which such parts are subjected, are accurately determined, and the parts made and adjusted accordingly. I also find that such extraneous conditions as those arising from the use of warped or imperfectly flat records may result in a failure of the indexing mechanism to arrest the tone-arm in the proper position for the engagement of the pickup stylus with the starting groove of a twelve-inch record.

It is, therefore, the primary object of this invention to provide a tone-arm indexing mechanism of the particular type mentioned, having an improved and novel construction effective to overcome the objections above noted. This improved and novel construction makes it possible to fabricate the parts within a wide range of manufacturing tolerances, to assemble the parts readily, and to insure positive and accurate operation of the mechanism, even if badly warped records are used.

Another object of this invention is to provide a tone-arm indexing mechanism with means which is effective not only to arrest the tone-arm in a position for engagement of the pickup stylus with either ten-inch or twelve-inch records, but which is also most effective to maintain the tone-arm, with assured positiveness, in the proper position until the pickup stylus actually engages a record to begin the playing thereof. In this manner, the tone-arm is protected against slight accidental displacements which might occur, during normal operation, between the time when the tone-arm is arrested, over the record to be played, and the time when the pickup stylus is brought into engagement with such record.

Still another and more specific object of the invention resides in the provision of an indexing arrangement which is capable of restraining the tone-arm when the latter, in moving under normal forces during a record-changing cycle, reaches a predetermined record-starting position over a record; and, which is adapted to yield when, during said cycle, the tone-arm is manipulated and forced past such a position. The arrangement is particularly characterized by the fact that the force required to displace the tone-arm past the stop in one direction, is greater than the force required to displace the tone-arm past the stop in the other direction. Such an arrangement has the advantage that forcible movement of the tone-arm beyond the proper record-starting position is noticeably resisted, but proper position may be readily reestablished if the tone-arm is so moved.

These and other objects, and the manner in which they are attained, will appear from the following description based upon the accompanying drawings which illustrate a preferred embodiment of the invention.

Figure 2:
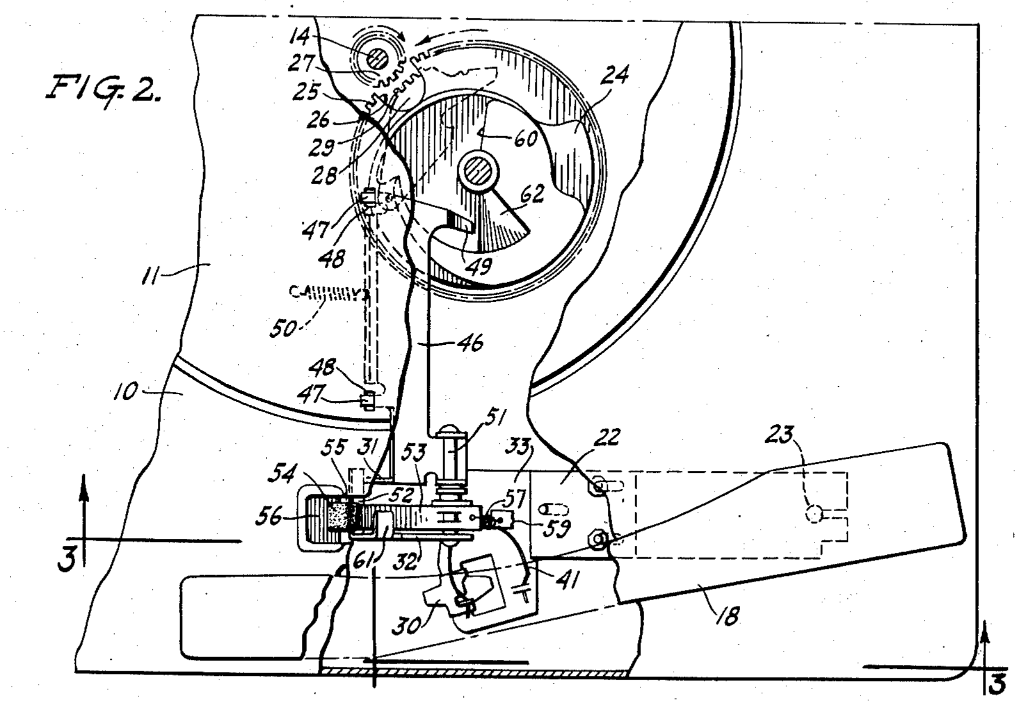
Figure 2 is an enlarged fragmentary plan view of a portion of the apparatus illustrated in Figure 1.

In the drawings, the invention, as illustrated, is adapted for cooperation with an automatic phonograph apparatus constructed in accordance with my copending application aforesaid. However, it is to be understood that the invention, in its broadest aspect, is not limited to that particular adaptation. Moreover, the drawings show only those mechanisms which are essential to a clear understanding of the invention, it being understood that the apparatus, as a whole, is provided with other mechanisms which go into the making of a complete automatic record-changer.

Figure 1:
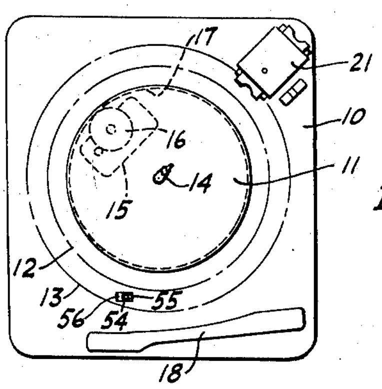
Figure 1 is a top plan view illustrating the general appearance and construction of an automatic phonograph apparatus with which the mechanism of the present invention is associated, the apparatus being shown on a greatly reduced scale.

With particular reference to the drawings, the phonograph apparatus, illustrated in Figure 1, comprises a horizontal supporting base or panel 10 which serves to support the various parts as hereinafter described. A turntable 11 is rotatably supported by the base 10 and is adapted to hold different-sized records, e. g. ten-inch and twelve-inch records, during the playing thereof. The outlines of two such records are shown at 12 and 13. As is customary, a central spindle 14 serves to center the records and retain them on the turntable. The turntable is driven by means of a suitable motor, indicated generally at 15, preferably through a driving wheel 16 frictionally engaging a depending peripheral flange 17 on the turntable. The tone-arm 18 is mounted on supporting base 10 for movement both horizontally and vertically relative to the turntable. The tone-arm carries a suitable pickup device 19 (Figure 3) having a stylus or needle 20 which is adapted to engage the records.

As shown, the phonograph apparatus is of the type in which a stack of records is supported above the turntable, and the records are fed successively to the turntable. To this end, the records to be played are supported above the turntable by the central spindle 14 and by a record supporting and feeding device 21 (Figure 1).

An arm 22 which is rigidly connected to the tone-arm 18 through the mounting spindle 23 thereof, serves to initiate a record-changing cycle at the end of the playing of each record. This arm 22 also serves to control the indexing or positioning of the tone-arm for commencing the playing of a succeeding record. During each record-changing cycle, the tone-arm is lifted off one record and moved outwardly beyond the peripheral edge thereof, the feeding device is actuated to drop another record onto the turntable, and the tone-arm is then moved inwardly and is lowered so as to bring the pickup stylus into engagement with the marginal portion of said other record.

The operations of the various parts during the record-changing cycle are effected and controlled by function of a cycling cam 24 (Figure 2). Cam 24 remains stationary during the playing of a record but undergoes a single complete revolution during the record-changing cycle. The cam is rotatably mounted on the underside of the supporting panel 10 and is provided with gear teeth 25. However, a portion of the cam is recessed or cut away, at 26, so as to be normally disengaged from a driving pinion 27, the latter being operatively connected with the turntable for rotation therewith. A segment 28 is movably mounted on the cam and has gear teeth 29 which are adapted to complete the cam gear and mesh with the teeth of the pinion 27 to initiate rotation of the cam. The segment is normally held in retracted position by means of a suitable latch (not shown) and is released for engagement with said pinion by means of a suitable trip (not shown), which trip comes into operation when the tone-arm reaches the terminal groove of a record being played. Actuation of the tone-arm and of the record-feeding device is effected through operation of the cycling cam 24 by means of connections (not shown) which provide the linkage between said cam and tone-arm. The mentioned latch, trip, and connections may be constructed and operated in the manner set forth in detail in my copending application aforesaid.

The general construction and operation of the apparatus above described, form no part of the present invention except insofar as they relate to and effect the improved tone-arm indexing mechanism which will now be explained with reference to Figures 2 to 9. The indexing mechanism includes means, in the form of a finger 30, disposed on the arm 22 for movement therewith and for engagement with either one of a pair of stop members 31 and 32 to locate the tone-arm in proper position for commencing the playing of either ten-inch or twelve-inch records. In practice, the finger 30 is conveniently carried by a rigid supporting plate 33 adapted for adjustable connection with the arm 22.

Figure 9:
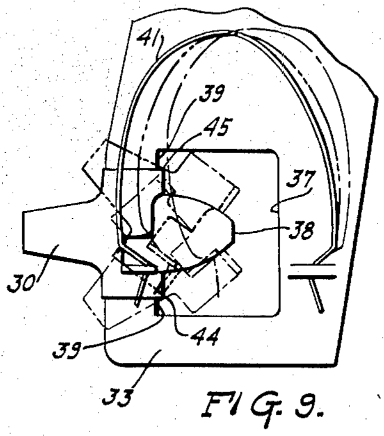

In accordance with the present invention, finger 30 is of rigid construction but is associated with the arm 22, through supporting plate 33, for movement in relation to said arm, when the tone-arm 18 is forced beyond the record-starting position or is subsequently returned to the proper record-starting position. For that purpose, means are provided to effect pivotal connection between finger 30 and supporting plate 33. Such pivotal connection is most reliably and effectively obtained by means of the particular construction illustrated in the drawings. As is more clearly shown in Figure 8, the finger 30 is provided with a rigid base portion 34 having a shelf-like extension 35 and a slot 36 at the juncture of said extension with said base portion. As is also more clearly shown in Figure 8, the plate 33 is provided with an opening 37 and with a tongue-like projection 38. This projection extends in the plane of opening 37 from a marginal edge 39 defining one side of said opening. The projection fits into the slot 36 of base portion 34, so that the shelf-like extension of the latter bears against the mentioned marginal edge 39, and the base portion itself bears against the adjoining surface 40 of plate 33. A spring element 41 is disposed to lie in the plane of plate 33 and has one end in engagement with said plate, as at 42, and the other end in engagement with the base portion of finger 30, as at 43. Thus, the spring element acts to hold finger 30 in its normal position and yet allows the finger to pivot in one direction, about corner 44, and in the other direction, about corner 45, as is represented in Figure 9. In order to provide for and to guide the pivotal movements of finger 30, the sides of tongue-like projection 38 converge on lines corresponding to the arcs described by corners 44 and 45 during such pivotal movements.

It is to be particularly noted that the spring element 41 is mounted off-center with respect to the base portion of finger 30 and engages said portion at a point adjacent corner 44, which corner is subjected to a shifting force during the record-changing cycle. It is also important to note that the mounting of the spring element is such that its major force is applied against said corner 44, and that the application of this force is in a line substantially perpendicular to the marginal edge 39 against which corners 44 and 45 bear. By so mounting the spring element, it is possible to utilize its forces to the best advantage. Thus the spring, by reason of its peculiar action on the finger structure, holds the finger in normal position on supporting plate 33; maintains the finger with sufficient rigidity to prevent its displacement when coming in contact with a stop member, during a record-changing cycle; opposes, with increased resistance, accidental displacement of the finger past the stop members but allows the finger to pivot in one direction for passage beyond the stop members, should the tone-arm be moved with excessive force past the record-starting position during such cycle; and, permits the finger to pivot in a reverse direction for repassage, with reduced resistance, over the stop members when the tone-arm is returned to record-starting position during the change cycle.

The construction and operation of stop members 31 and 32, and their cooperation with finger 30, are best illustrated in Figures 2 to 7. As more clearly shown in Figure 2, stop member 31 is provided with an extension 46 which is located adjacent the underside of supporting panel 10 and suitably hinged thereto. For that purpose, hangers 47 are conveniently provided on extension 46 and are disposed for engagement with apertures 48 in said panel. One end of extension 46 is provided with a downwardly projected finger 49 which engages the upper surface of cam 24. Normally, the weight of finger 49 is sufficient to assure its engagement with the upper surface of the cam, but if desired, a spring 50 may be provided to urge said finger into positive contact with said cam surface. The opposite end of extension 46 carries a pin 51 on which the stop member 32 is pivotally mounted. The latter is provided with a lateral extension 52 disposed for abutting engagement with stop member 31. The stop member 32 is pivoted off its center of gravity, so that it normally tends to follow the swinging movement of stop member 31.

Figure 3:
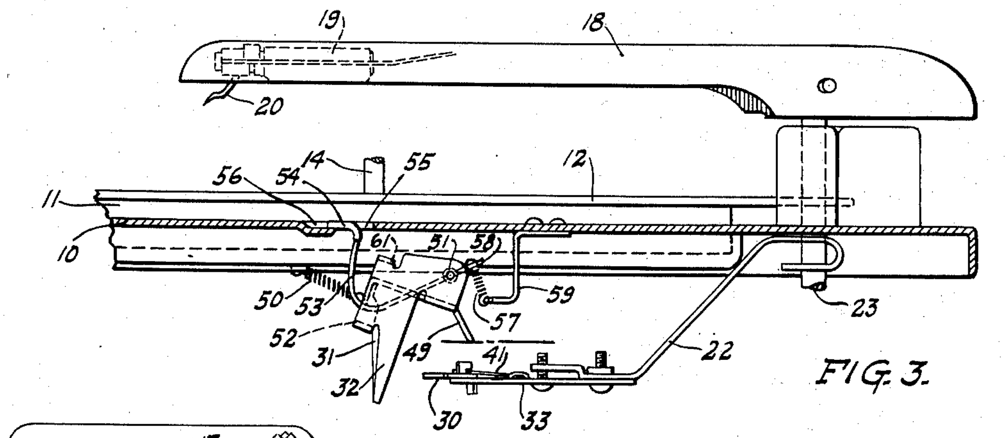
Figure 3 is a sectional view taken substantially along line 3—3 of Figure 2, showing the tone-arm indexing mechanism in its inoperative position, certain parts having been removed for the sake of clarity.

As may be clearly seen in Figure 3, a generally S-shaped lever 53 is pivoted on pin 51. The upper end 54 of lever 51 projects through an opening 55 in the base plate or panel 10 and normally rests within a depression 56 in said panel. This upper end 54 is located outside the area occupied by a ten-inch record on the turntable but is disposed to lie beneath that portion of a twelve-inch record which extends beyond such area (see Figure 1). A yieldable link 57, such as a weak coil spring, is connected to the lower end 58 of said S-shaped lever and to a bracket 59 affixed to the underside of supporting base or panel 10.

Figure 4:
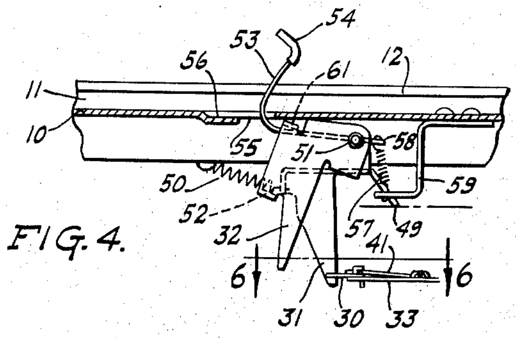
Figure 4 is a fragmentary view of a portion of Figure 3, showing the tone-arm indexing mechanism in one of its operative positions.
Figure 5:
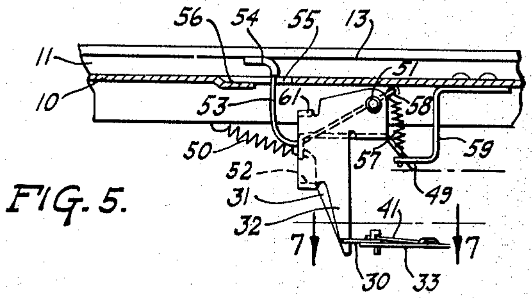
Figure 5 is a view similar to Figure 4, showing the tone-arm indexing mechanism in another of its operative positions.

Normally, both stop members 31 and 32, and the S-shaped lever 53, are in the position shown in Figure 3 and remain in that position until a record has been dropped onto the turntable. Assuming first that a ten-inch record has been dropped, the depending finger 49 is engaged by an abrupt rise 60 (Figure 2) on cam 24 to move the stop member 31 to its operative position as shown in Figure 4. This movement of stop member 31 causes upward displacement of pin 51 which, in turn, tends to lift the lower end 58 of S-shaped lever 53. However, link 57 prevents such lifting, and the main portion of S-shaped lever 53 is thereby caused to pivot upwardly about pin 51, so that the upper end 54 of said lever swings to the elevated position shown in Figure 4. The lever 53, in its upward pivotal movement, meets an extension 61 on stop member 32 and thus carries the latter to an inoperative position out of alignment with respect to the stop member 31, as is shown in Figure 4. Under such conditions, stop member 31, being positioned in the path of movement of finger 30, is effective to locate the tone-arm in position for starting the playing of a ten-inch record. In the event that a twelve-inch record has been dropped onto the turntable, the upper end 54 of lever 53 encounters the overlying portion of the record, as is represented in Figure 5. Accordingly, upward pivotal movement of lever 53 is restrained so as to prevent its engagement with extension 61 on stop member 32. Thus, the latter is free to assume its operative position in the path of movement of finger 30, and ahead of stop member 31, in which position the member 32 is effective to index the tone-arm in position for starting the playing of a twelve-inch record.

With reference to Figure 5, it will be noted that the yieldability of link 57 makes it possible to hold the lever 53 at an appreciable distance from extension 61 on stop member 32, when the upper end of said lever is in contact with the overlying surface of a twelve-inch record. In this manner, irregularities in the flatness of such surface will merely cause the lever 53 to oscillate up and down without effecting the operative position of stop member 32.

Figure 6:
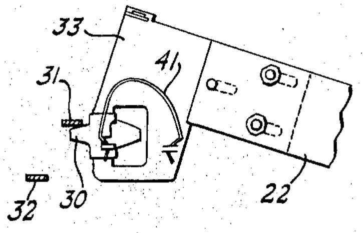
Figure 6 is a sectional view looking in the direction of the arrows on line 6—6 of Figure 4.
Figure 7:
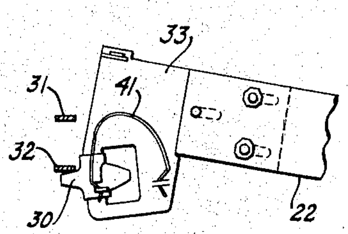
Figure 7 is a sectional view looking in the direction of the arrows on line 7—7 of Figure 5.
Figure 8:
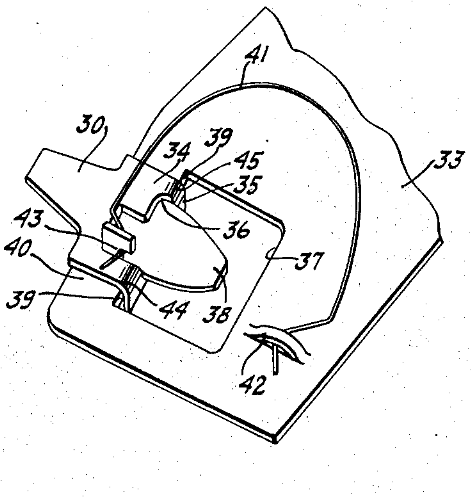
Figure 8 is a fragmentary view showing, in perspective and on an enlarged scale, the construction of the improved stop means; and, Figure 9 is an explanatory view illustrating the safety feature of such stop means.

From the foregoing description, and as is apparent from Figures 6 and 7, the indexing of the tone-arm is effected by the engagement of projecting finger 30 with either of the above-mentioned stop members, depending upon which one is effective to restrain the inward movement of the tone-arm and to index the latter properly for beginning the playing of either ten-inch or twelve-inch records. While the inward movement of the tone-arm is being thus restrained, the tone-arm is lowered to bring the pickup stylus into engagement with the marginal portion of the record. Near the end of the record-changing cycle, finger 49 rides down an incline 62 (Figure 2) on cam 44 and the stop members 31 and 32 return to their normal inoperative positions (Figure 3). The tone arm is then free to move inwardly during the playing of the record.

In view of the foregoing, it will be appreciated that a tone-arm indexing mechanism constructed in accordance with the present invention, is most effective to insure positive control of the tone-arm during a record-changing cycle in an automatic phonograph. The efficiency and reliability of the tone-arm indexing mechanism is enhanced by the fact that the invention makes it possible to arrest the tone-arm, with positive action, in record-starting position and to hold it, with rigidity, in that position until the pickup stylus engages the record. Moreover, the dependability and efficaciousness of the indexing mechanism is increased due to the particular characteristic feature of the invention which makes it difficult to displace the tone-arm past its proper record-engaging position but which, should the tone-arm be so displaced, permits its return, with ease, to proper position.

Although a particular embodiment of the invention has been described with great particularity, it is to be understood that this has been done by way of example only. Various changes in the details of construction and in the combination and arrangement of parts may be resorted to without departing from the spirit of the invention, which is subject only to such limitations as are imposed by the prior art or are specifically called for in the appended claims.

I claim:

1. Phonograph tone-arm indexing mechanism comprising: in combination with a cycling cam periodically operable to swing the tone-arm toward record engaging position, a stop element linked to the tone-arm to swing therewith; a first stop member supported at a predetermined point in the path of movement of said element and movable to an operative position in which it intercepts said element and locates the tone-arm to commence the playing of a record of smaller diameter; a second stop member supported at another predetermined point in the path of movement of said element and movable to an operative position in which it intercepts said element and locates the tone-arm to commence the playing of a record of larger diameter; means coupling the first stop member and said cycling cam and actuatable by said cam to move the first stop member to its operative position; and means coupled with the second stop member and disposed in position to be acted upon by a record of larger diameter to move said second stop member to its operative position.

2. Phonograph tone-arm indexing mechanism as set forth in claim 1, and in which the said stop element is pivotally linked to the tone-arm, and spring means is connected to and yieldably mounts said element.

3. Phonograph tone-arm indexing mechanism comprising: in combination with a cycling cam periodically operable to swing the tone-arm toward record engaging position, an elongated arm connected with the tone-arm to swing therewith; a finger mounted on said elongated arm and projecting therefrom; a first stop member hingedly supported at a predetermined point in the path of movement of said finger and swingably movable to an operative position in which it intercepts said finger and locates the tone-arm to commence the playing of a record of one diameter; a second stop member hingedly supported at another predetermined point in the path of movement of said finger and swingably movable to an operative position in which it intercepts said finger and locates the tone-arm to commence the playing of a record of another diameter; means coupling the first stop member and said cycling cam and actuatable by said cam to move the said first stop member to its operative position; and a lever coupled with said second stop member and disposed in position to be acted upon by a record of the said other diameter to move said second stop member to its operative position.

4. Phonograph tone-arm indexing mechanism in accordance with claim 3, and further characterized in that there is included resilient means provided for yieldable displacement of said finger with respect to said elongated arm in the event that said tone-arm is forced past a position in which said finger is in contact with one of said stop members.

5. In phonograph apparatus, a movable tone-arm, a stop effective to determine the starting position of the tone-arm, a finger, a second arm connected with the tone-arm and supporting said finger in position to engage said stop, said second arm having an aperture therein and a tongue-like projection extending from an edge of said aperture inwardly thereof, said finger having a portion extending within said aperture and a slot through which said tongue-like projection extends, and means providing freedom for yieldable pivotal movement of said finger with respect to said second arm and about said projection, said last means comprising a spring element reacting between said second arm and said finger and yieldably maintaining the stated portion of said finger in contact with the mentioned edge of the aperture provided in said second arm.

6. Phonograph apparatus in accordance with claim 5, and further characterized in that said spring element reacts against said finger in a position off-center with respect to said tongue-like projection, whereby the force required to effect pivotal movement of said finger in one direction is greater than the force required to effect pivotal movement of said finger in the reverse direction.

HERMANN E. F. C. LINGENBRINK.

REFERENCES CITED

The following references are of record in the file of this patent:

UNITED STATES PATENTS

| Number | Name | Date |
|---|---|---|
| 1,879,291 | Johnson et al. | Sept. 27, 1932 |
| 1,919,378 | Pepin | July 25, 1933 |
| 2,263,643 | Offen | Nov. 25, 1941 |
| 2,366,858 | Knox et al. | Jan. 9, 1945 |